June 23, 1970  A. MILOCHEVITCH  3,517,159
APPARATUS FOR CONTINUOUSLY WELDING OPTICAL
ELEMENTS WITHOUT DEFORMATION
Filed June 28, 1968  2 Sheets-Sheet 1

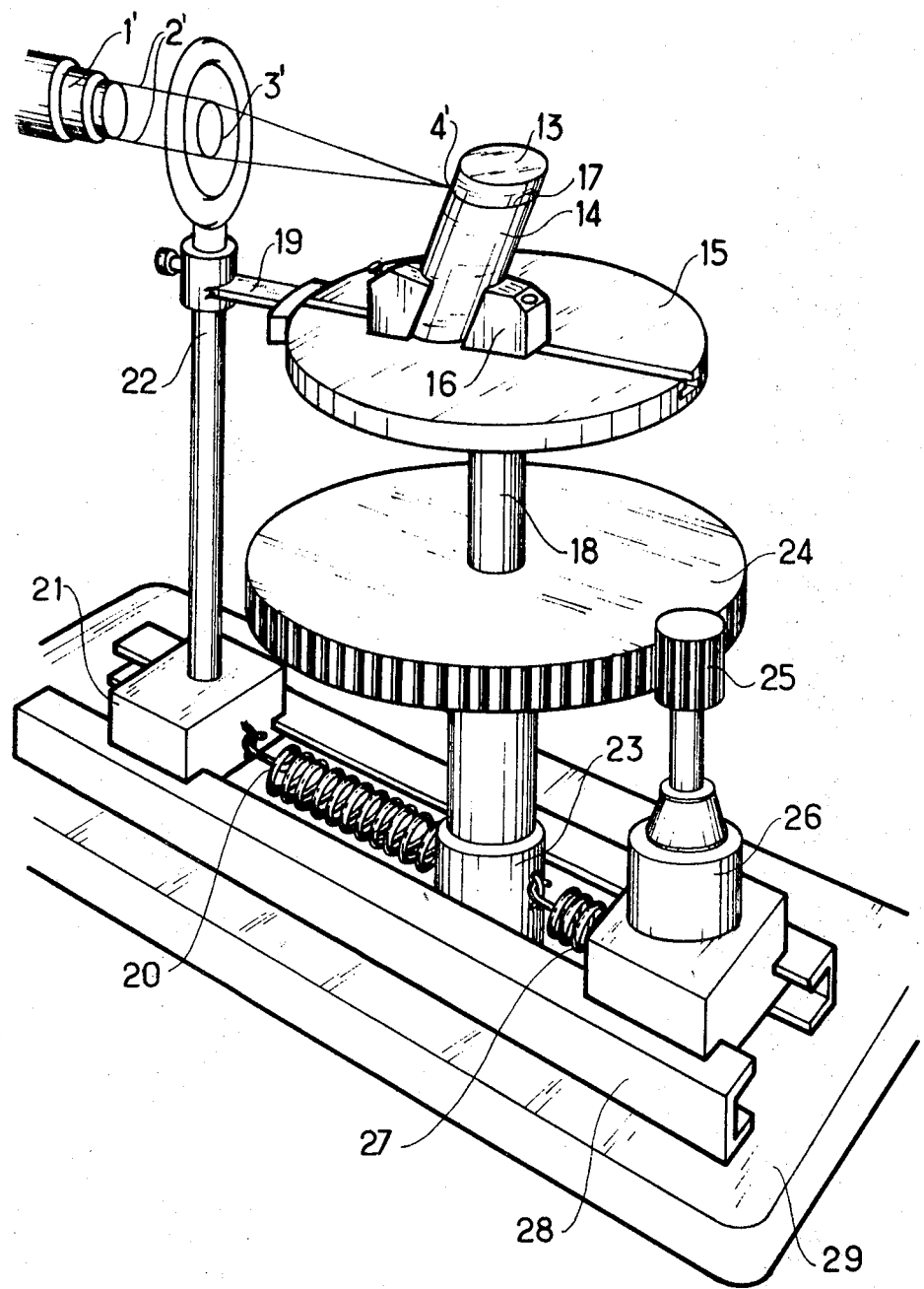

United States Patent Office 3,517,159
Patented June 23, 1970

3,517,159
APPARATUS FOR CONTINUOUSLY WELDING OPTICAL ELEMENTS WITHOUT DEFORMATION
Alexandre Milochevitch, Saint-Michel-sur-Orge, France, assignor to Compagnie Generale d'Electricite, Paris, France, a corporation of France
Filed June 28, 1968, Ser. No. 740,957
Claims priority, application France, June 28, 1967, 112,295
Int. Cl. B23k 27/00
U.S. Cl. 219—121
3 Claims

ABSTRACT OF THE DISCLOSURE

Laser beam welding of optically polished elements in planar contact by focusing the laser beam at a point on the contact line between the elements and rotating the elements at a constant linear speed past the focusing point.

---

The present invention relates to a method of continuously welding optical elements without deformation and especially to the welding of optical tubes for obtaining fluid-tight cavities, and relates more particularly to an apparatus by which the welding energy beam may be radiated with high localized conversion onto the contact surface of the elements being welded.

In the past, such assemblies have been achieved by bonding the elements with a ceramic-based bonding agent since, the known weldings deteriorate or deform the optical elements being assembled.

The major disadvantage of the bonding method with ceramic-based bonding agents resides in the evolution of gases by the layer of bonding agent material when the cavity is heated in the course of operation. This introduces impurities into the cavity, greatly reducing the subsequent useful life of the cavity.

An object of the present invention is to eliminate the defects resulting from the employment of an intermediate layer or foreign agent between the opposed surfaces which are brought into contact prior to welding. For this reason, the surfaces are optically polished in order to improve their initial contact and thereafter, the maximum energy, which is advantageously supplied by a stimulated emission radiation source, in particular of the laser type, is concentrated on the curved line defined by the optically contacting external lips of the surfaces, the radiation being concentrated by a convergent optical system.

In order to maintain the quality of the weld, it is desirable to dispose the assembly of parts to be welded on a movable support to cause the line of contact between the parts or elements to travel past, at a constant speed, the image focus of the optical concentration system which is continuously maintained on the line of contact between the elements.

This type of arrangement is quite simple when welding a circular disc to a cylindrical tube of like cross section, in which case it is sufficient to bring the axis of the tube into coincidence with the axis of rotation of the plate or support to which it is fixedly attached.

In the case where an elliptical disc corresponding to the oblique cross section of a cylindrical tube is attached to the latter by a foil forming a window with the rays issuing therefrom at an incidence corresponding to the Brewster angle, two reference surfaces are necessary in order to make the support satisfy the two conditions necessary; (1) the line of contact must travel past a beam focused at a constant linear speed and (2) the optical concentration system must be maintained at a constant distance from the moving line of contact.

The apparatus according to the present invention for continuously welding optical elements without deformation to obtain a cylindrical tube forming a fluid-tight cavity involves optically polishing the surfaces to be welded which are brought into optical contact and continuously focusing the welding energy obtained by radiation by means of an optical system on the line separating the two parts being welded, which line is caused to travel past the focal point of the optical system at constant liner speed.

The objects of the present invention and other advantages thereof will become apparent from the following description, in which:

FIG. 2 is a perspective view of a second embodiment of the present invention comprising an apparatus for welding to a tube a foil having oblique incidence, at the Brewster angle.

Figure 1:
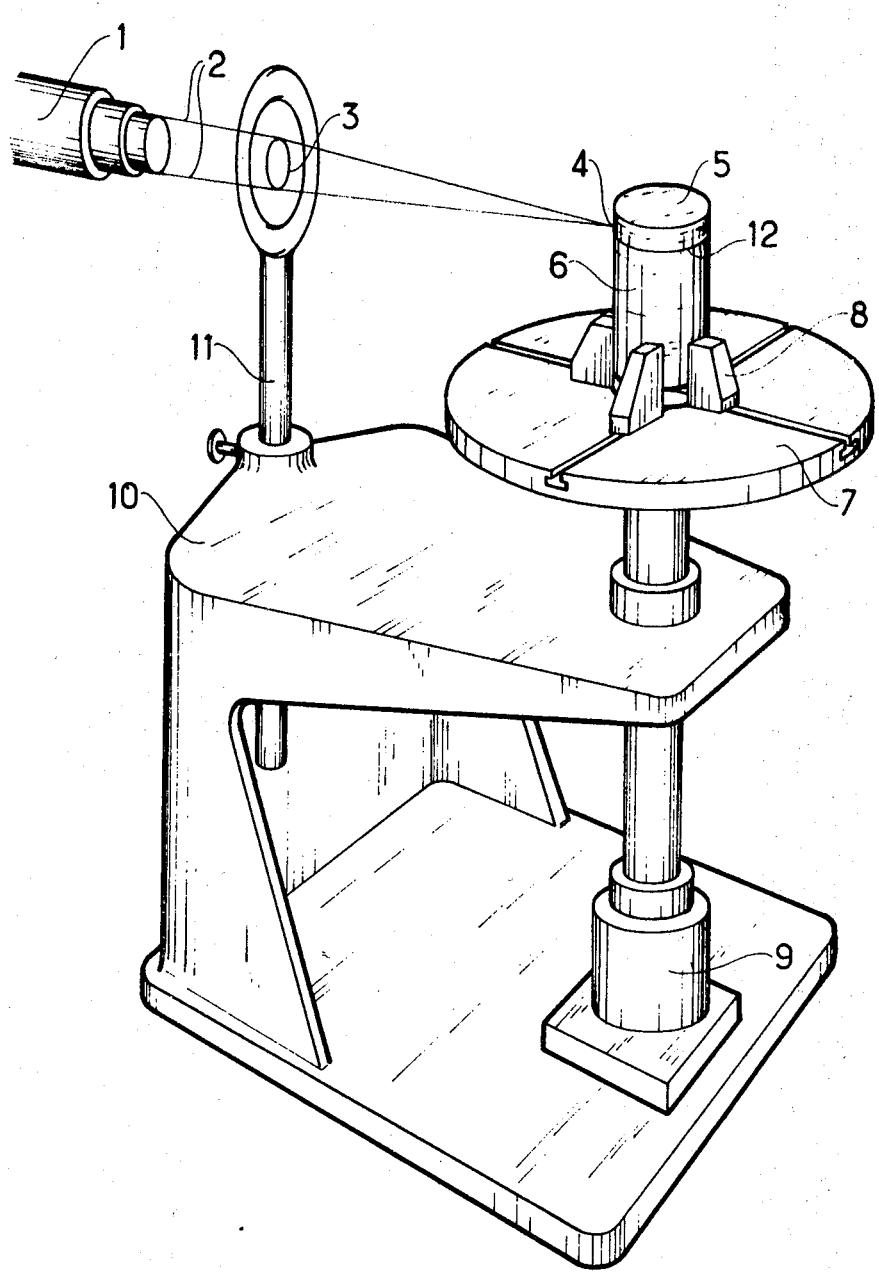
FIG. 1 is a perspective view of the apparatus for welding a tube to a circular disc consisting of multiple dielectric layers and forming a mirror.

Referring to FIG. 1, there is shown a laser tube 1 which emits a beam 2 of coherent light having substantially parallel rays which are focused by a convergent lens 3 at its image focus 4.

When the tube 1 operates with emission of the molecular carbon dioxide laser type, having an emitted wavelength of 10.6 microns, the lens 3 consists of sodium chloride and is therefore transparent to this radiation.

A quartz tube 6 is mounted on a plate 7 by securing the same to jaws 8, the quartz tube 6 being adapted to be welded to a circular quartz disc 5 which overlies the same and is in contact therewith.

The axis of tube 6 coincides with the axis of rotation of plate 7, the plate being driven at a constant speed by motor 9 which is fixed to the stationary support structure 10 on which the assembly is mounted. The concentrating lens 3 is in turn mounted on a support 11 which is adjustably fixed relative to the supporting structure 10. In this way, during the rotation of the driving plate 7, the point 4 on which the welding energy is concentrated, constantly falls on the external circular line of contact 12 between the two surfaces being welded. The disc 5 has, on the one hand, received on its surface, opposite the tube 6, a multi-layer treatment, by which it is converted into a dielectric mirror. On the other hand, the disc 5 has been optically polished on its periphery of the same surface so that it comes into optical contact with the corresponding end of the tube 6 which has also been subjected to the same polishing to facilitate welding. The prepolishing of these members is advantageously carried out in a known manner employing cerium powder.

The beam is concentrated at a point 4 on line 12 of a power in the order of 100 to 150 watts, the concentration being effected on a spot which is so adjusted as to be equally distributed on either side of the line 12. Welding is then achieved by causing the line 12 to travel past the beam at a constant linear speed. Good results are obtained in the welding of a disc having a diameter of 4 centimeters by causing it to perform one revolution of rotation in a period of between 3 and 5 minutes. This represents a substantial saving of time as compared with earlier bonding methods.

It may also be desirable to rotate the assembly more rapidly, in which case welding is effected as the result of a number of revolutions of the support 7 instead of one.

Referring next to FIG. 2, it is noted that disc 13 is elliptical and is horizontally positioned on a cylindrical tube 14 which is of circular cross section but whose axis is oblique in relation to the vertical axis of rotation of the driven support plate 15 to which it is secured by means of jaws 17. The choice of the oblique angle of the foil between the disc 13 and the cylinder 14 is determined by the emergence of light rays substantially parallel to the axis of the cylinder and extending through the foil at the Brewster angle. The line of contact 17 on the outside of the two surfaces to be welded is therefore an ellipse, the center of which is positioned on the axis of the plate driving shaft 18 by adjusting the same at the time of assembly of the elements. The two surfaces to be welded are optically polished before they are brought into contact for welding. On the other hand, a weld of good quality is obtained by effecting a satisfactory mounting or assembling of these elements under two essential conditions: (1) the maintenance of the point of convergence 4' on the line 17 and (2) travel of the line 17 at constant linear speed in relation to the point 4'. For this purpose, there is employed, respectively, two reference surfaces, one for ensuring correct positioning of the point 4' and the other for the uniform travel of the welding line 17. Again, a laser beam source 1' provides a beam 2' which is focused by the employment of lens 3'.

The profile of the plate 15 is obtained by prolonging the vector radius extending through the center of an ellipse equal to the ellipse formed by line 17 by a constant length beyond any point of the latter.

An arm 19 is rigidly secured to rod 22, which acts to support the lens 3' and is maintained in contact with the edge of the plate 15 by means of a return spring 20 which is secured to the movable foot 21 of rod 22. This ensures constancy of distance between the lens 3' and the line 17 during the rotation of plate 15 and therefore the maintenance of the focus point 4' on line 17.

For driving plate 15, there is provided shaft 18 to which the plate 15 is coupled, the shaft rotating within bearing 23. A toothed wheel 24 whose profile is homothetic relative to plate 15 is fixed to shaft 18. A toothed wheel 25 of circular profile is in mesh with toothed wheel 25 and is driven at a constant speed by motor 26, the toothed wheel 24 being in constant mesh with driving wheel 25 under the action of return spring 27. The two return springs 20 and 27 which are secured to bearing 23, act on foot 21 and motor 26, respectively, the latter members both sliding on the same set of guide rails 28 formed with slideways. The rails 28 are mounted on the base 29 in the same way as the remainder of the assembly.

This method of rotating the support plate 15 ensures that the line 17 travels at the desired constant linear speed in relation to the point of energy concentration 4' which is constantly maintained on the line.

It will be obvious that the foregoing descriptions of the two embodiments of the present invention have been given only as examples of the application of the welding method according to the present invention.

Likewise, many details of the mounting of each of the described devices may be varied, while many different combinations and arrangements of the elements are possible without departing from the field of application of the present invention.

The application of the present invention to the welding of quartz discs to quartz tubes for producing laser-effect resonating cavities is particularly interesting since, the formed products are particularly stable by reason of their good thermal and mechanical properties when subjected to the thermal stresse of welding and to stresses resulting from mechanical operation. Moreover, when assembled with various electrodes, such cavities can readily undergo degassing of the various elements which are contained therein by merely passing the assembly through a furnace having an appropriate thermal cycle.

It is to be understood that materials other than quartz may be subjected to such autogenous welding operation which requires both a high concentration of energy on a material having low thermal conductivity and a sufficient localization of the weld point to avoid deformation of the parts or elements being welded.

The welding of optical elements, mirrors comprising dielectric layers or foils having parallel faces forming windows having a Brewster angle of incidence, without deformation to the tube for forming laser-effect cavities is particularly advantageous, both by reason of the quality of the manufactured apparatus and by reason of the reliability of the formed product by the elimination of all of the defects inherent in the earlier bonding method. The advantages of the method can be equally obtained in any other application requiring optical precision, mechanical stability and chemical purity which results by the welding with a high concentration of energy which ensures, by its extreme localization, very high energy density.

What is claimed is:

1. An apparatus for continuously welding a planar optical element to a second optical element along an elliptical line comprising a rotating support means for supporting the elements to be welded including; a rotating shaft having a fixed axis, a first plate mounted on said shaft for supporting said elements, the peripheral shape of said first plate being defined by a closed curve obtained by addition of a constant length to the vector radius of an ellipse centered on the axis of said shaft; a second plate mounted on said shaft, the peripheral shape of said second plate being homothetic to that of said first plate, driving means operatively connected to said second plate for rotating said second plate with a constant peripheral velocity and an electromagnetic energy supply means including a fixed, high energy electromagnetic beam source and optical concentration means disposed in the path of said beam on a support radially movable with respect to its axis said support comprising a sliding spacing member cooperating with the edge of said first plate and a return spring operatively coupled to said first plate for ensuring permanent contact thereof by said spacing member.

2. The apparatus as claimed in claim 1 wherein said driving means comprises a constant speed motor coupled to a toothed wheel of circular cross section and wherein the periphery of said second plate is provided with gear teeth, and means biasing said toothed wheel and said peripheral teeth in continual mesh.

3. The apparatus as claimed in claim 1 wherein said movable support comprises a base slidably carried by a pair of longitudinally extending, spaced, parallel guide rails forming parallel slideways.

References Cited

UNITED STATES PATENTS

| 2,932,720 | 4/1960 | Stohr | 219—121 |
| 3,210,171 | 10/1965 | MacDonald | 331—94.5 |
| 3,217,088 | 11/1965 | Steierman | 219—121 |
| 3,250,842 | 5/1966 | Hikido | 219—121 |
| 3,259,730 | 7/1966 | Wehde et al. | 219—121 |

WILLIAM DEXTER BROOKS, Primary Examiner

U.S. Cl. X.R.

219—69